United States Patent [19]
Holzmann

[11] Patent Number: 5,559,904
[45] Date of Patent: Sep. 24, 1996

[54] METHOD AND APPARATUS FOR DERIVING IMAGE WIDTH AND HEIGHT FROM RAW GRAPHICAL IMAGE DATA

[75] Inventor: Gerard J. Holzmann, Murray Hill, N.J.

[73] Assignee: Lucent Technologies Inc., Murray Hill, N.J.

[21] Appl. No.: 401,655

[22] Filed: Mar. 10, 1995

Related U.S. Application Data

[63] Continuation-in-part of Ser. No. 134,234, Oct. 8, 1993, abandoned.

[51] Int. Cl.$^6$ .................................................. G06K 9/36
[52] U.S. Cl. ............................................. 382/286; 382/278
[58] Field of Search ................................. 382/286, 194, 382/203, 278, 302

[56] References Cited

U.S. PATENT DOCUMENTS

| | | | |
|---|---|---|---|
| 5,129,013 | 7/1992 | Holzmann et al. | 382/44 |
| 5,287,417 | 2/1994 | Eller et al. | 382/41 |

*Primary Examiner*—Leo Boudreau
*Assistant Examiner*—Phuoc Tran

[57] ABSTRACT

The present invention involves a method of deriving the height and width of a graphic image from raw graphical image data stored in a computer system. It includes commencing execution of a height-width derivation program in the computer system and, at least once, operating the height-width derivation program to perform a series of steps. These include calculating the area of the image size, e.g. using the total number of bytes, and calculating the square root of the area to obtain a first value, and then determining by assumption a first assumed width and a first assumed height. For example, these assumptions may be achieved by calculating one half of the first value to obtain a first assumed width value and dividing the area by the first assumed width value to obtain a first assumed height value. Next, the first assumed height value and first assumed width value are rounded to the nearest whole number, further adjusting said values by predetermined increments and the resulting adjusted values are multiplied until their product produces the closest value equal to the area of the image size to obtain a second assumed height value and a second assumed width value. The method also involves a series of iterations to determine error indexes for various altered assumed values and finding the values with the lowest error index.

20 Claims, 5 Drawing Sheets

```
1  /*** main.****************************************/
2
3  #include <stdio.h>
4  #include <sys/file.h>
5  #include <sys/types.h>
6  #include <sys/stat.h>
7  #include <fcntl.h>
8  #include <math.h>
9
10
11 long guess(int, int, char *);
12 char *malloc(int);
13
14
15 void
16 fatal(char *s, char *t)
17 {    printf(s, t);
18      exit(1);
19 }
20
21 void
22 main(int argc, char *argv[])
23 {    char *buf;
24      struct stat bam;
25      int fd, w, h, i;
26      int min, minw, minh, new, verbose=0, bwformat=0;
27
28      if (argc == 3 && strcmp(argv[1], "-v") == 0)
29      {        verbose = 1;
30               argc--; argv++;
31      }
32      if (argc == 3 && strcmp(argv[1], "-b") == 0)
33      {        bwformat = 1;
34               argc--; argv++;
35      }
36
37      if (argc != 2)
38               fatal("usage: guess [-v] [-b] file\n", 0);
39      if ((fd = open(argv[1], O_RDONLY)) < 0)
40               fatal("guess: cannot open %s\n", argv[1]);
41      if (fstat(fd, &bam) != 0)
42               fatal("guess: cannot stat file\n", 0);
43      if (!(buf = malloc(bam.st_size*sizeof(char))))
44               fatal("guess: not enough memory\n", 0);
45      if (read(fd, buf, bam.st_size) != bam.st_size)
46               fatal("guess: read error\n", 0);
47
48      i = (int) sqrt((double)(bam.st_size)+1.0);
49      min = -1;
```

FIG. 2

```
50      for (w = i/2; w < 2*i; w++)
51      {       h = bam.st_size/w;
52              if (w*h != bam.st_size) continue;
53              new = guess(w,h,buf);
54              if (new < min || min < 0)
55                      {       min = new; minw = w; minh = h;
56                              if (verbose)
57                                      printf("%dx%d = %ld\n", w, h,new);
58                      }
59      }
60      if (minw == 0)
61              fatal("%s: cannot guess\n", argv[1]);
62      if (bwformat)
63      { printf("addheader %d %d %s\n", minw, minh ,argv[1]);
64              exit(0);
65      }
66      printf("%s: %dx%dx1(bw)", argv[1], minw, minh);
67      if (3*(minh/3) == minh)
68              printf(" or %dx%dx3 (color)", minw, minh/3);
69      if (4*(minh/4) == minh)
70          printf(" or %dx%dx4 (color+alpha)", minw, minh/4);
71      printf("\n");
72 }
73
74 long
75 guess(int w, int h, char *b)
76 {   register int x, y, i, e;
77      long d=0;
78      int fromy, toy, fromx, tox;
79
80      fromx = w/4; tox = (3*w)/4;
81
82      fromy = h/4; if (fromy < 1) fromy = 1;
83      toy = (3*h)/4; if (toy > h-1) toy = h-1;
84
85      for (y = fromy; y < toy; y++)
86      for (x = fromx; x < tox; x++)
87      {       i = y*w+x;
88              e = 2*b[i] - (b[i-w] + b[i+w]);
89              if (e > 0) d += e; else d -= e;
90      }
91      return d;
92 }
```

FIG. 3

METHOD AND APPARATUS FOR DERIVING IMAGE WIDTH AND HEIGHT FROM RAW GRAPHICAL IMAGE DATA

This is a continuation-in-part of application Ser. No. 08/134,234 filed on Oct. 8, 1993, now abandoned.

BACKGROUND OF THE INVENTION

1. Field of the Invention

The present invention relates to a method of determining heights and widths of graphic images when only the raw computer data of the images is available. The method includes the use of a computer and an algorithm to develop assumed values and includes error index calculations to arrive at height and width values with the lowest error index.

2. Information Disclosure Statement

Computer Systems have been used to operate algorithms to solve computer related problems for many years. U.S. Pat. No. 5,129,013 to Gerard J. Holzmann and Robert C. Pike describes a graphic image editor in which editing commands are inputted into a computer by a user to form an image transformation function using algorithms so as to define how to alter pixels of an image and which portions of that image to alter. This patent not only illustrates the use of algorithms, but also illustrates a basic understanding by the artisan of the creation of computer images by pixels. These images are stored by a structured set of raw image data to establish pixel intensity, color, etc. and each line of an image is formed of a predetermined set or pixels represented by some whole number.

Attempts have been made to develop programs for predetermining heights and widths of rectangular graphic images from raw computer data, but these have been slow and unreliable.

One commercially available program for computer graphics, known as Adobe Photoshop, includes an option for reading in raw image files; however, Adobe Photoshop requires the user to supply height and width while the present invention method includes the use of a computer and an algorithm to derive height and width.

Thus, it is believed that the method of the present invention is neither taught nor suggested in the prior art.

SUMMARY OF THE INVENTION

The present invention involves a method of deriving the height and width of a graphic image from raw image data stored in a computer system. It includes commencing execution of a height-width derivation program in the computer system and, at least once, operating the height-width derivation program to perform a series of steps. These include calculating the area of the image size, e.g. using the total number of bytes, and calculating the square root of the area to obtain a first value, and then determining by assumption a first assumed width and a first assumed height. For example, these assumptions may be achieved by calculating one half of the first value to obtain a first assumed width value and dividing the area by the first assumed width value to obtain a first assumed height value. Next, the first assumed height value and first assumed width value are rounded to the nearest whole number, further adjusting said values by predetermined increments and the resulting adjusted values are multiplied until their product produces the closest value equal to the area of the image to obtain a second assumed height value and a second assumed width value. The method also involves a series of iterations to determine error indexes for various altered assumed values and finding the values with the lowest error index.

BRIEF DESCRIPTION OF THE DRAWINGS

The present invention is more fully understood when the specification herein is taken in conjunction with the drawings appended hereto, wherein:

FIGS. 2 and 3 illustrate source code, written in the C programming language, of a detailed, possible embodiment of the present invention method;

DETAILED DESCRIPTION OF THE PRESENT INVENTION

The present invention is directed to a reliable method of determining the height and width of a rectangular image from raw graphics image data 112. This raw data is assumed to be unencoded and uncompressed as referred to herein.

Figure 1:
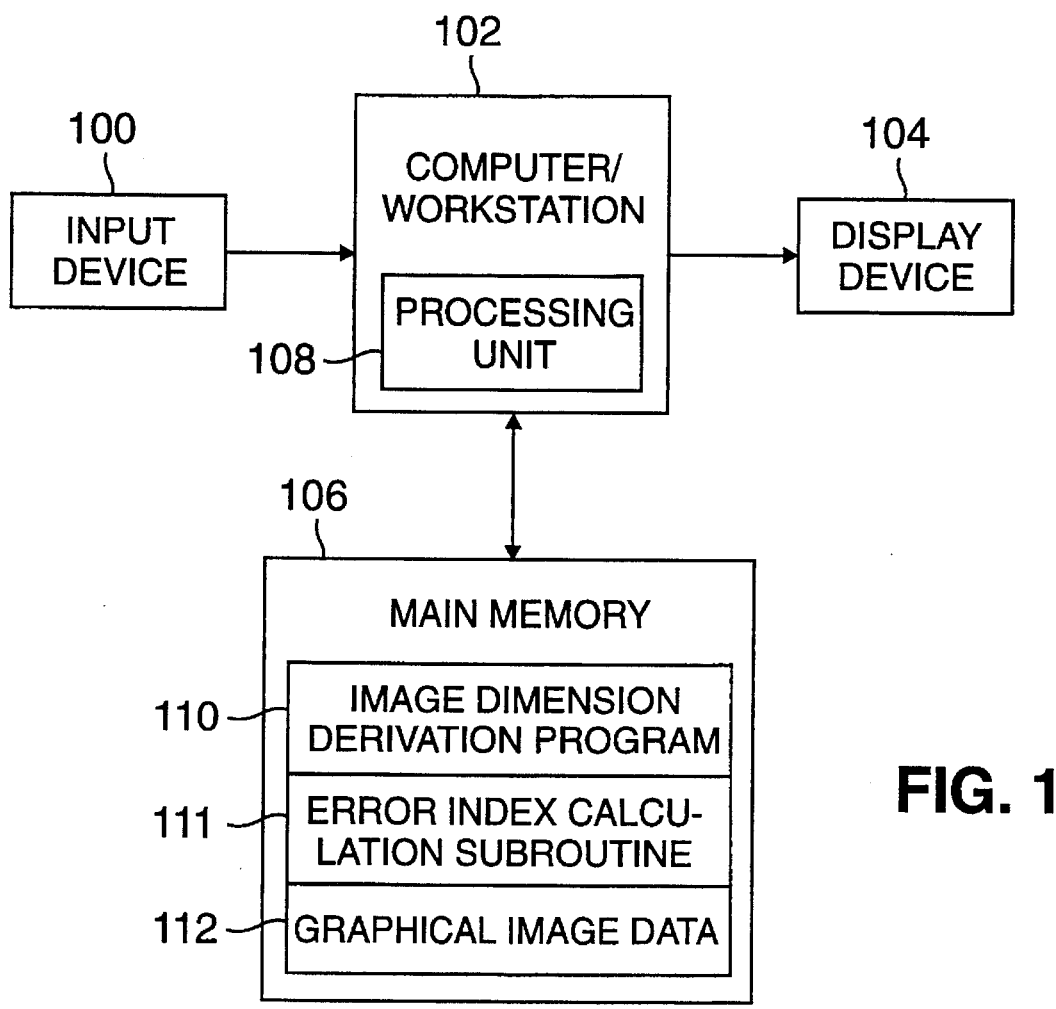
FIG. 1 illustrates a typical computer system which might be used to practice the present invention.

The method is performed by operation of an algorithm within a basic computer or a complete computer system, such as is shown in FIG. 1. A user has access to an input device 100. This may be a scanner, a disk drive, a keyboard, or other known input device or combination of input devices, to input data, such as raw graphical image data 112, and to input commands to a computer 102. Computer 102, having one or more processing units 108, may be a minicomputer or a mainframe computer, or any type of desktop, stand alone, notebook or other computer. A graphics display device 104 may optionally be connected to display image files in the form of displayed images, as well as in the form of raw graphical image data 112, and to display programs, commands and operations of a user.

The present invention method utilizes an image dimension derivation program 110 and an error index calculation subroutine 111, discussed below in conjunction with FIGS. 2 through 5, stored in the main memory 106 of computer 102 which is used to operate on the raw graphical image data 112 in accordance with the present invention method. The processing unit 108 is preferably configured to implement the image dimension derivation program 110 and the error index calculation subroutine 111 associated with the present invention, which may be stored in the main memory 106.

FIG. 1 could have a different configuration without exceeding the present invention method. For example, computer systems with a plurality of computers connected to one another may be used, where these computers simultaneously calculate approximate height-width values and error indexes for a given set of raw graphical image data 112 and, at the end of the parallel calculations the height-width values with the lowest error index are selected and presented as the end result.

Figure 4:
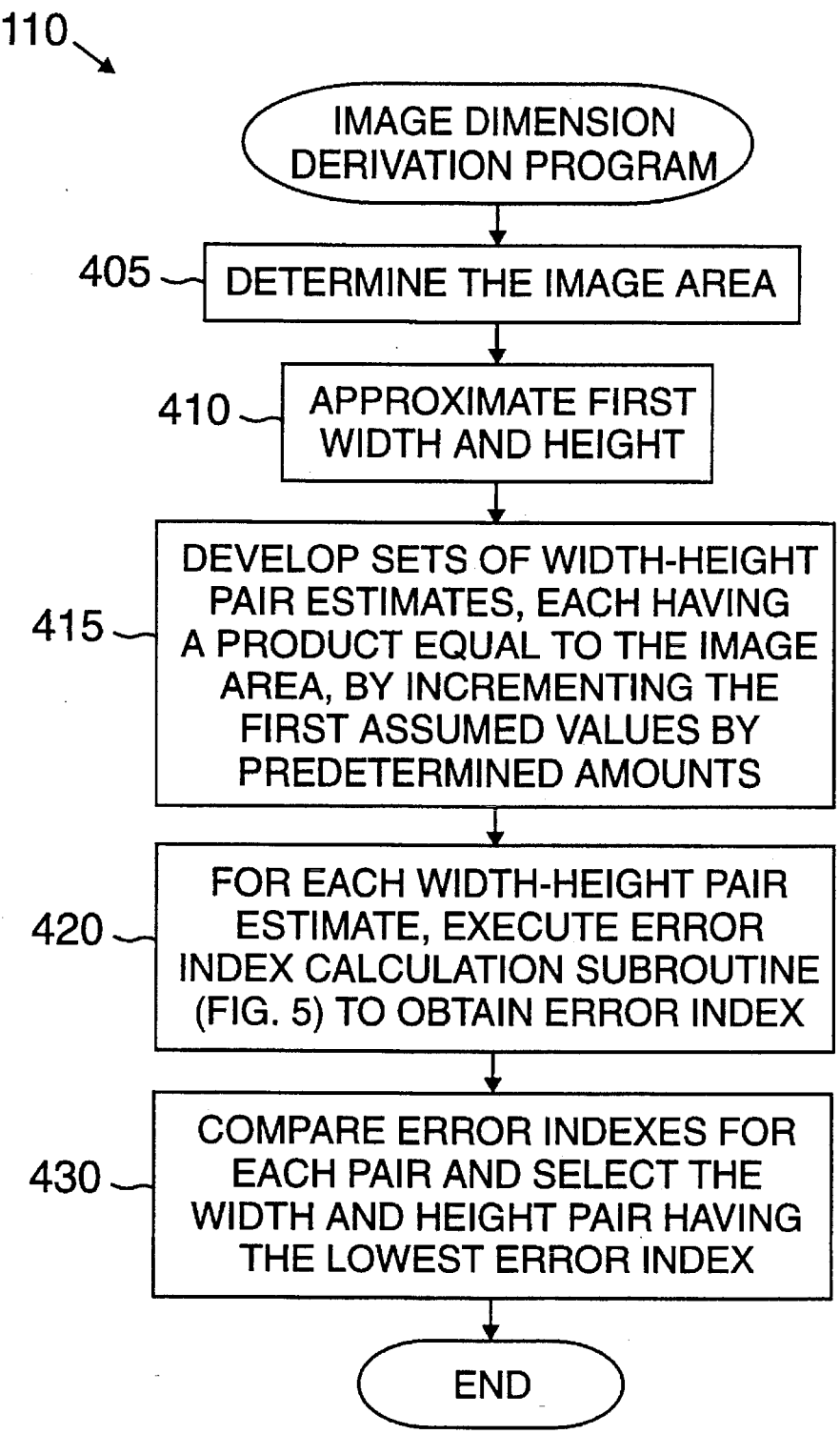
FIG. 4 is a flow diagram describing an exemplary image dimension derivation program according to the present invention.

The present invention has as its main object the ability to arrive at accurate and reliable heights and widths of rectangular (including square) images using only raw graphical image data. As shown in FIG. 4, the image dimension derivation program 110 used in the present method operates with the raw graphical image data 112 by first determining, during step 405, an accurate measurement of the area of the image. For example, the sum of the total number of pixels is the area in square pixels. For black and white images, the number of bytes equals the number of pixels which equals the area. For color images, three bytes are used per pixel so that the number of bytes divided by three equals the area. For images having n number of channels, the area is the total number of bytes divided by the whole integer n.

After the program determines the area of the images, an assumption is made during step 410 regarding a first approximation of height or width or both. Thus, since width multiplied by height equals area, the square root of the area is a first approximation for the width or height. In one preferred embodiment, the program takes the square root of the area to obtain a value, takes one half of that value to calculate a first assumed width and then divides the area by that width to obtain a first assumed height.

The program next adjusts the first assumed width and height values during step 415, to produce sets of width and height pair estimates. In one embodiment, the sets of width and height pair estimates are obtained by rounding the first assumed values to the nearest whole number, and then further adjusting said assumed values by predetermined increments up to a predefined upper limit to identify each pair of adjusted values having a product equal to the area of the image, i.e. image size.

Figure 5:
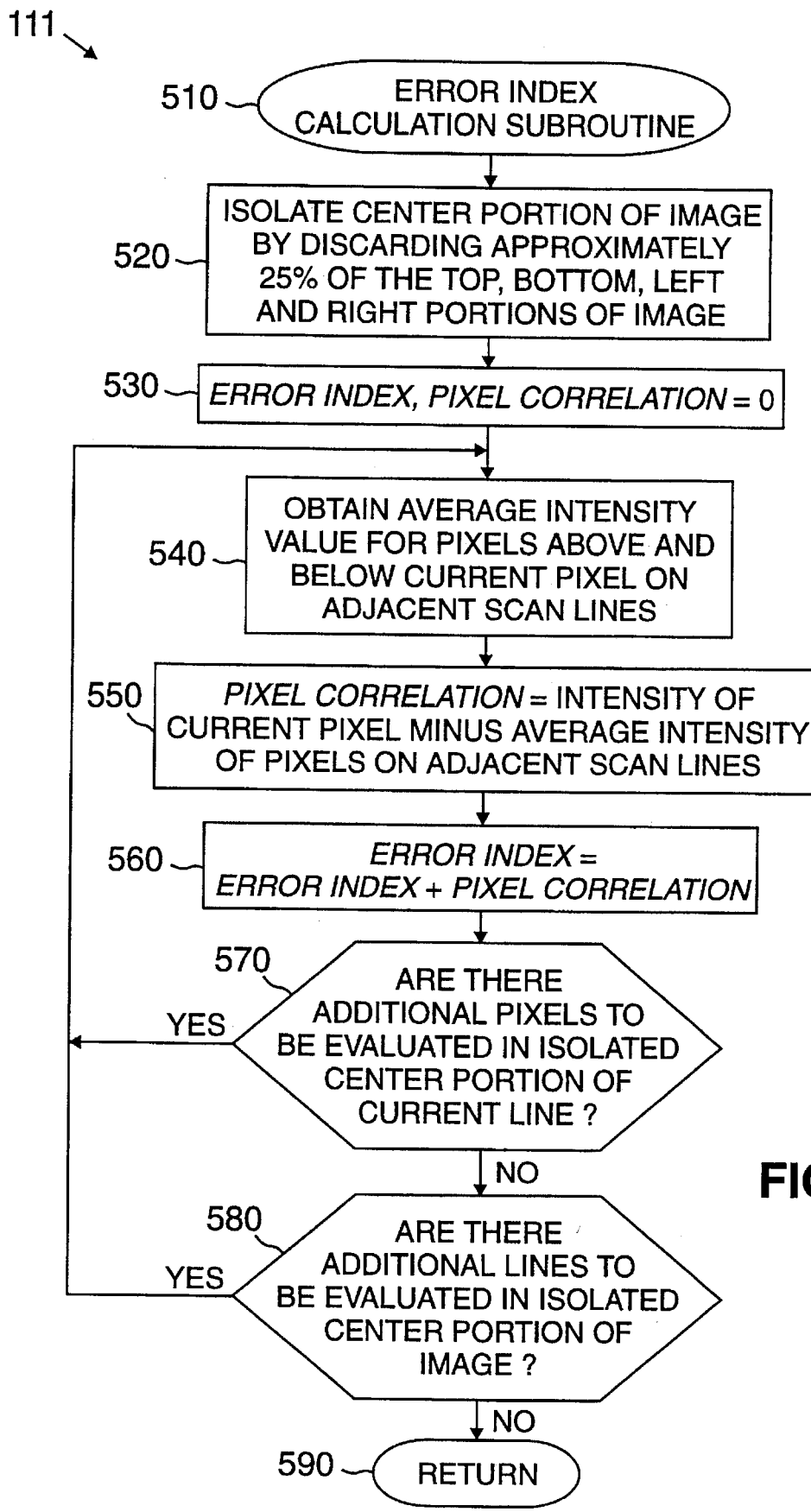
FIG. 5 is a flow diagram describing an exemplary error index calculation subroutine, suitable for use by the image dimension derivation program of FIG. 4.

Error-indexing is the next step in the program of typical embodiments of the present invention. In a preferred embodiment, an error index calculation subroutine 111, discussed below in conjunction with FIG. 5, is executed during step 420 to calculate the error index for each width-height pair estimate. Although this error-indexing is performed after initial possible values are determined during step 415, the error-indexing steps substantially enhance the accuracy of the results.

As discussed below in conjunction with FIG. 5, the error-indexing of the program assumes that each of the width-height pair estimates represents a rectangular image. An error index is preferably calculated by determining and utilizing an isolated center portion of the image rectangle having the assumed dimensions, and testing the correlation of the data in neighboring scanlines, in a manner described below. Finally, the error indexes for each of the width-height pair estimates are compared during step 430 and the pair of height and width values having the lowest error index is the best approximation and the final results.

As previously indicated, the image dimension derivation program 110 will preferably execute the error index calculation subroutine 111 during step 420 for each width-height pair estimate to calculate the error index. In one embodiment, illustrated in FIG. 5, the error index calculation subroutine will be entered at step 510 and will assume a rectangular image based on the assumed height and the assumed width of the width-height pair currently being evaluated.

The error index calculation subroutine 111 will preferably isolate a center portion of the assumed rectangular image during step 520, for example, by discarding top and bottom 20% to 30% (e.g. 25%) and left and right 20% to 30% (e.g. 25%) of the image data. An error index variable and a pixel correlation variable are preferably initialized during step 530. Thereafter, for the remaining undiscarded image data, the correlation of the image data in adjacent scan lines is tested during steps 540 through 580.

The average intensity value for the pixels above and below the current pixel on adjacent scan lines is preferably obtained during step 540. Thereafter, the pixel correlation for the current pixel is calculated during step 550 by subtracting the average intensity of the adjacent pixels, obtained in the previous step, from the intensity value of the current pixel.

The pixel correlation calculated for the current pixel is then added to the error index being maintained for all of the pixels in the isolated center region of the image during step 560. Thereafter, a test is performed during step 570 to determine if there are additional pixels to be evaluated in the isolated center portion of the current line. If it is determined during step 570 that there are additional pixels to be evaluated in the isolated center portion of the current line, then program control will return to step 540 and continue in the manner described above to evaluate the pixels remaining in the current line.

If, however, it is determined during step 570 that there are no additional pixels to be evaluated in the isolated center portion of the current line, then program control will proceed to step 580. A test is performed during step 580 to determine if there are additional lines to be evaluated in the isolated center portion of the image. If it is determined during step 580 that there are additional lines to be evaluated in the isolated center portion of the image, then program control will return to step 540 and continue in the manner described above to evaluate the pixels in the next line.

If, however, it is determined during step 580 that there are no additional lines to be evaluated in the isolated center portion of the image, then program control will proceed to step 590, where program control will return to the calling function, namely, the image dimension derivation program 110 with the error index calculated for the current width-height pair.

In those situations where the number of channels of the image is unknown, additional steps may be taken. The method then includes calculating separate error indexes for each possible n (e.g. n=1 6 4) value and then selecting values based on the lowest error index of all results obtained.

One source code of the above preferred embodiment is illustrated in FIGS. 2 and 3 written in the C programming language. The C programming language is well known and is described in many readily available publications. An artisan receiving the Figures will now readily understand the program and viable alternatives.

Obviously, numerous modifications and variations of the present invention are possible in light of the above teachings. It is therefore understood that within the scope of the appended claims, the invention may be practiced otherwise than as specifically described herein.

What is claimed is:

1. A method for use in image reconstruction for calculating the width and height of a graphical image having unknown dimensions, said graphical image being represented by graphical image data, said graphical image data comprised of a plurality of data elements, each of said data elements representing a characteristic of a region of said graphical image, said method employing a computing system having one or more processors and a memory device, said method comprising the steps of:

storing said graphical image data in said memory device;

analyzing said memory device to obtain a size in memory units of said stored graphical image data using at least one of said processors, said size representing the area of said image in pixel units;

obtaining a plurality of pixel width-height pair estimates, each of said pixel width-height pair estimates having a product equal to said area of said image in pixel units;

calculating an error index for each of said width-height pair estimates, said error indexes evaluating the correlation of brightness values of vertically adjacent pixels in said stored graphical image data corresponding to a configuration of said graphical image having the width and height associated with the corresponding width-height pair estimate; and determining the width and height in pixels of the graphical image by selecting the width-height pair estimate having the lowest error index to produce graphical image data corresponding to a graphical image of known dimensions.

2. The method according to claim 1, wherein said step of analyzing said memory device to determine the area of said image comprises the steps of:

determining the number of bytes in said graphical image data; and dividing said number of bytes by the number of channels in said graphical image to determine said image area.

3. The method of claim 1, wherein the number of channels in said graphical image is unknown, and wherein said method further comprises the steps of calculating a separate error index for each possible number of channels in said graphical image, and selecting the width and height-values based upon the lowest error index.

4. The method of claim 1, wherein said step of obtaining a plurality of width-height pair estimates comprises the step of identifying each width-height pair in a predefined range that are whole numbers and have a product equal to said area of said image.

5. The method of claim 4, wherein said predefined range has a lower limit equal to a predefined fraction of the square root of said image area and has an upper limit equal to a predefined multiple of said square root of said image area.

6. The method of claim 1, wherein said step of calculating the error index for each width-height pair comprises the step of calculating the error index for an isolated rectangular portion of said image.

7. The method of claim 1, wherein said step of calculating the error index comprises the steps of:

obtaining an average intensity value for pixels vertically adjacent to a center pixel on a predetermined number of lines;

obtaining the pixel correlation for said center pixel by subtracting the intensity value for the center pixel from said average intensity of said vertically adjacent pixels;

adding said pixel correlation to said error index for said width-height pair; and repeating said foregoing steps for each of said pixels in at least a rectangular portion of said graphical image.

8. The method according to claim 1, further comprising the step of displaying said graphical image represented by said graphical image data having said selected width and height.

9. The method according to claim 1, further comprising the step of printing said graphical image represented by said graphical image data having said selected width and height.

10. An apparatus for use in image reconstruction for calculating the width and height of a graphical image having unknown dimensions, said graphical image being represented by graphical image data, said apparatus comprising:

a memory for storing said graphical image data;

at least one processor for processing said stored graphical image data, each said processor further comprising:
means for determining the area of said graphical image;
means for generating a plurality of width-height pair estimates, each of said width-height pair estimates having a product equal to said area of said image;

means for calculating an error index for each of said width-height pair estimates, said error indexes evaluating the correlation of vertically adjacent pixels in said stored graphical image data for a graphical image having the width and height associated with the corresponding width-height pair estimate; and means for selecting the width-height pair estimate having the lowest error index as the number of pixels in the width and height of said graphical image.

11. The apparatus according to claim 10, wherein said means for determining the area of said graphical image further comprises:

means for determining the number of bytes in said graphical image data; and means for dividing said number of bytes by the number of channels in said graphical image to determine said image area.

12. The apparatus of claim 10, wherein the number of channels in said graphical image is unknown, and wherein said processor further comprises means for calculating a separate error index for each possible number of channels in said graphical image, and means for selecting the width and height values based upon the lowest error index.

13. The apparatus of claim 10, wherein said means for generating a plurality of width-height pair estimates includes means for identifying each width-height pair in a predefined range that are whole numbers and have a product equal to said area of said image.

14. The apparatus of claim 13, wherein said predefined range has a lower limit equal to a predefined fraction of the square root of said image area and has an upper limit equal to a predefined multiple of said square root of said image area.

15. The apparatus of claim 10, wherein said means for calculating the error index for each width-height pair comprises means for calculating the error index for an isolated rectangular portion of said image.

16. The apparatus of claim 10, wherein said means for calculating the error index comprises means for analyzing each of said pixels in at least a rectangular portion of said graphical image to obtain an average intensity value for pixels vertically adjacent to each pixel on a predetermined number of lines, and the pixel correlation for each pixel by subtracting the intensity value for the center pixel from said average intensity of said vertically adjacent pixels and further comprising means for adding said pixel correlation for each pixel in said rectangular portion of said image to said error index for said width-height pair.

17. The apparatus according to claim 10, further including means for displaying said graphical image represented by said graphical image data having said selected width and height.

18. The apparatus according to claim 10, further including means for printing said graphical image represented by said graphical image data having said selected width and height.

19. An improved image reconstruction apparatus implemented in a computing system, said computing system comprising a memory and at least one processor, wherein the improvement comprises:

said memory for storing graphical image data, said graphical image data representing a graphical image having unknown dimensions;

each said processor being operable to process said stored graphical image data for calculating the width and height of said graphical image, each said processor further comprising:
means for determining the area of said graphical image;

means for generating a plurality of width-height pair estimates, each of said Width-height pair estimates having a product equal to said area of said image;

means for calculating an error index for each of said width-height pair estimates, said error indexes evaluating the correlation of vertically adjacent pixels in said stored graphical image data for a graphical image having the width and height associated with the corresponding width-height pair estimate; and means for selecting the width-height pair estimate having the lowest error index as the number of pixels in the width and height of said graphical image.

20. In a method of calculating the width and height of a graphical image having unknown dimensions employing a computing system having one or more processors and a memory device, the improvement comprising:

storing graphical image data representing said graphical image in said memory device for use in image reconstruction, said graphical image data comprising a plurality of data elements, each of said data elements representing the brightness of a region of said graphical image;

analyzing said memory device to obtain a size in memory units of said stored graphical image data using at least one of said processors, said size representing the area of said image in pixel units;

obtaining a plurality of pixel width-height pair estimates, each of said pixel width-height pair estimates having a product equal to said area of said image in pixel units;

calculating an error index for each of said width-height pair estimates, said error indexes evaluating the correlation of brightness values of vertically adjacent pixels in said stored graphical image data corresponding to a configuration of said graphical image having the width and height associated with the corresponding width-height pair estimate; and determining the width and height in pixels of the graphical image by selecting the width-height pair estimate having the lowest error index to produce graphical image data corresponding to a graphical image of known dimensions.

* * * * *